(No Model.) 2 Sheets—Sheet 1.

A. HARNISH.
OVEN.

No. 539,810. Patented May 28, 1895.

WITNESSES:
Ralph Wormelle
A. E. Belanier

INVENTOR
Abraham Harnish

BY
Patrick O'Farrell
ATTORNEY.

(No Model.) 2 Sheets—Sheet 2.
A. HARNISH.
OVEN.
No. 539,810. Patented May 28, 1895.
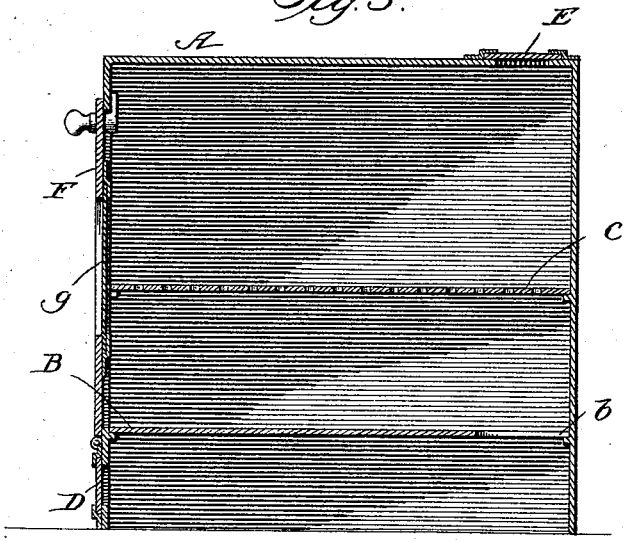
WITNESSES:
Edwin L. Bradford
INVENTOR
Abraham Harnish
BY
Patrick O'Farrell
ATTORNEY.

UNITED STATES PATENT OFFICE.

ABRAHAM HARNISH, OF BUYERSTOWN, PENNSYLVANIA.

OVEN.

SPECIFICATION forming part of Letters Patent No. 539,810, dated May 28, 1895.

Application filed October 8, 1894. Serial No. 525,252. (No model.)

*To all whom it may concern:*

Be it known that I, ABRAHAM HARNISH, a citizen of the United States of America, residing at Buyerstown, in the county of Lancaster and State of Pennsylvania, have invented certain new and useful Improvements in Ovens, of which the following is a specification, reference being had therein to the accompanying drawings.

My invention aims to provide an oven, portable in character, and which can be used in connection with any ordinary heating or cooking stove presenting sufficient flat surface for the oven to rest upon, and radiating enough heat for purposes of cooking, roasting, baking and frying. The main purpose is the provision of an oven that can be placed upon the top of an ordinary kitchen range or cook stove, and which will be simple, light and efficient for the purposes designed.

The improvements consist of the novel features and the peculiar construction and combination of the parts which hereinafter will be more fully described and claimed, and which are shown in the annexed drawings, in which—

Figure 1:
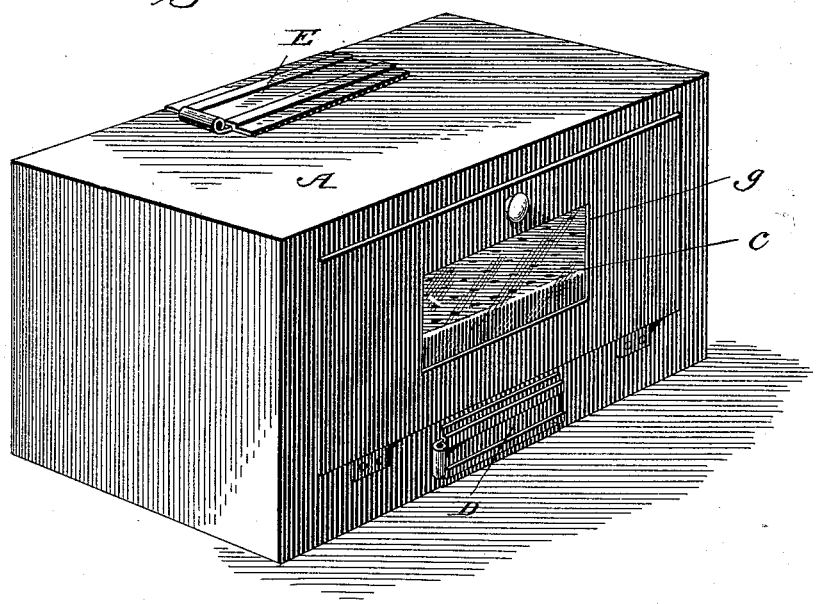
Figure 2:
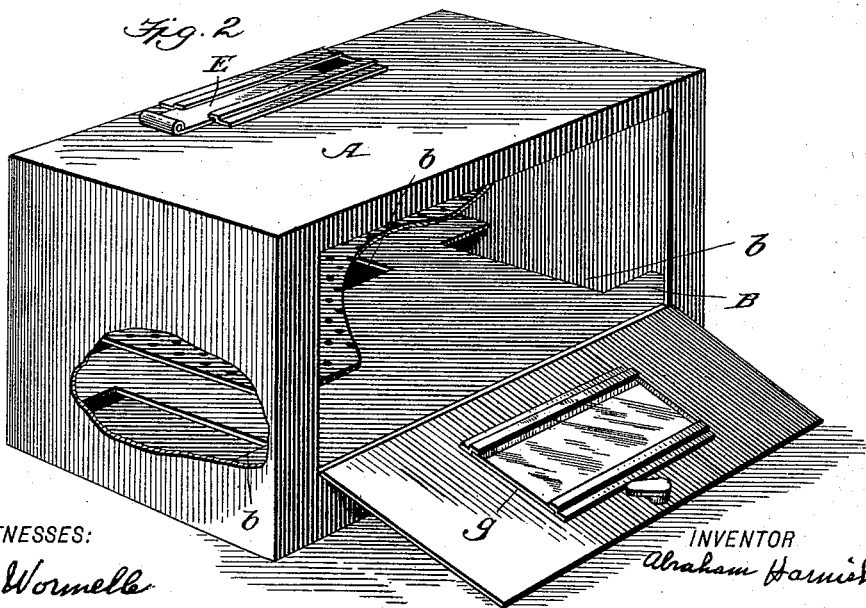

Figure 1 is a perspective view of an oven embodying all the essentials of the invention. Fig. 2 is a perspective view of the same, the oven-door being opened, the draft-slides being partially drawn back, and parts being broken away to show the interior construction and relative arrangement of parts. Fig. 3 is a vertical cross-section of the oven.

The oven is a rectangular shaped case A, closed on its top and sides, and open at the bottom, and constructed of stout sheet metal, Russia iron, sheet iron, or sheet metal as preferred. A plate B located at a proper distance from the lower edge of the walls of the case is attached at its edges to the said walls and serves to distribute the heat uniformly throughout the oven and prevent the burning of the articles to be cooked or otherwise heated in the oven. Elongated openings $b$ are provided in the ends and rear edge of the plate for the passage of the heat into the oven from the hot air chamber below the plate B. These openings are long and narrow and occupy a middle position in the length of the edges in which they are formed. A perforated plate $c$ is located a short distance above the plate B, and forms a shelf to receive the pan or vessel or the article to be cooked. By having this plate $c$ formed of rectangular sheet metal instead of being a grate, the heat is further distributed so as to keep the oven at a nearly uniform temperature at any given time. A slide D, is located at the front of the oven below the plane of the plate B, and controls the admission of air to the chamber formed below the said plate. A corresponding slide E, is located in the top of the oven contiguous to the rear wall. These slides D and E close openings in the respective walls of the oven and by a proper adjustment of the same the temperature of the oven can be moderated. If the oven is too hot the slides D and E, are properly adjusted so that the hot air can escape through the top opening closed by the slide E, and cool air enter by the opening closed by the slide D.

The front of the oven is closed by a door F, which is hinged to open downward, and is held closed by the usual turnbutton $f$. A sight opening $g$ in the oven door admits of observation into the oven without necessitating the opening of the door which would result in the loss of considerable heat. This opening is protected by mica or other translucent substance through which inspection may be had.

The oven is placed upon a stove and the articles to be cooked are placed upon the plate $c$ in any ordinary manner.

The temperature of the oven is moderated by a proper adjustment of the slides D and E as hereinbefore stated.

The use of this oven will not in anywise interfere with the use of the oven provided in the range or cooking stove, and both may be used together.

I claim—

A portable oven having its bottom open, a horizontal plate located a short distance above the oven bottom and attached at its edges to the walls of the oven, and having openings in three of its edges, a perforated plate located above the lower plate to equalize the temperature and form a shelf, a slide controlled opening in the walls of the oven opposite the fourth or imperforate edge of the lower plate to admit cool air for tempering the oven, and a second slide controlled opening in the oven top diagonally opposite the lower slide controlled opening to permit the heated air of the oven to escape in proper quantities, substantially as described.

In testimony whereof I affix my signature in presence of two witnesses.

ABRAHAM HARNISH.

Witnesses:
B. MAURICE HERR,
I. R. FRANCIS.